United States Patent [19]

Polkinghorne et al.

[11] 4,027,218
[45] May 31, 1977

[54] ELECTRONIC CONTROLS

[75] Inventors: Alan Polkinghorne; Raymond Frank Wood, both of Cockermouth, England

[73] Assignee: Doublefell Limited, Workington, England

[22] Filed: Dec. 2, 1974

[21] Appl. No.: 528,660

[30] Foreign Application Priority Data

Dec. 1, 1973 United Kingdom ............ 55774/73

[52] U.S. Cl. ............................................ 318/327
[51] Int. Cl.² ...................................... H02P 5/00
[58] Field of Search .......................... 318/326–328; 307/141

[56] References Cited

UNITED STATES PATENTS

| 3,694,720 | 9/1972 | Nakajima | 318/327 X |
| 3,783,360 | 1/1974 | Bundy | 318/327 |
| 3,783,651 | 1/1974 | Karklys | 307/141 X |
| 3,843,914 | 10/1974 | Carlson et al. | 318/327 |
| 3,844,299 | 10/1974 | Athey et al. | 307/141 UX |

Primary Examiner—Gene Z. Rubinson
Attorney, Agent, or Firm—Scrivener, Parker, Scrivener & Clarke

[57] ABSTRACT

An electronic control for a laundry washing machine is timed by mains derived pulses which are counted for timing. A plurality of executive blocks are summoned in turn to regulate the various operations by time signals from the counter and by sensors denoting the conditions are right; the drum speed is derived from an error signal but the speed regulating signal mainly comprises the integral of the true error signal.

2 Claims, 10 Drawing Figures

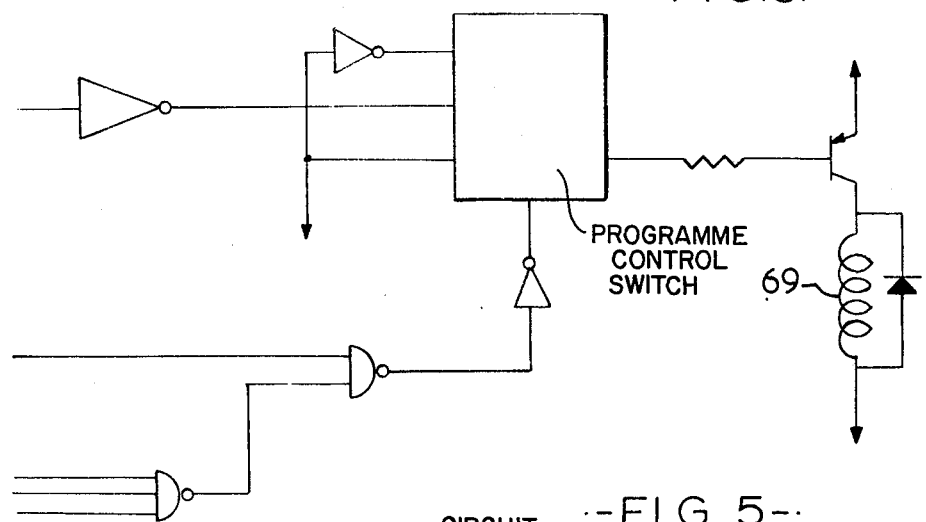
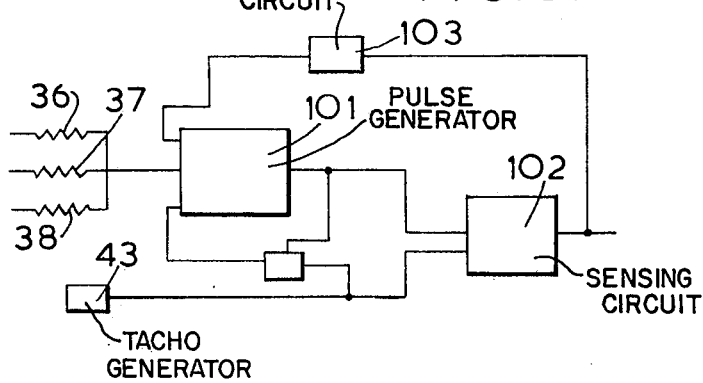
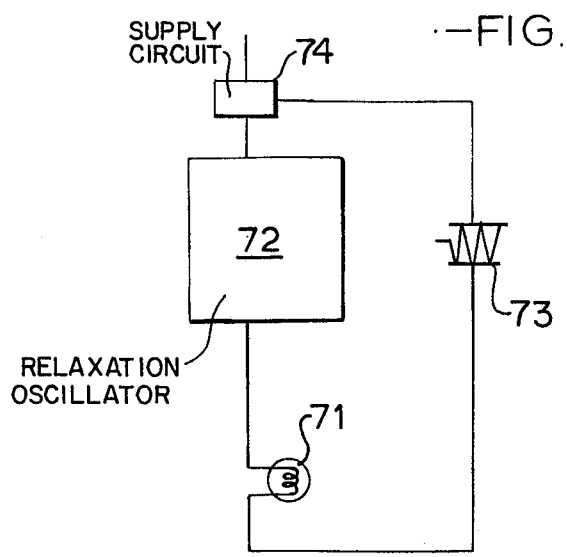

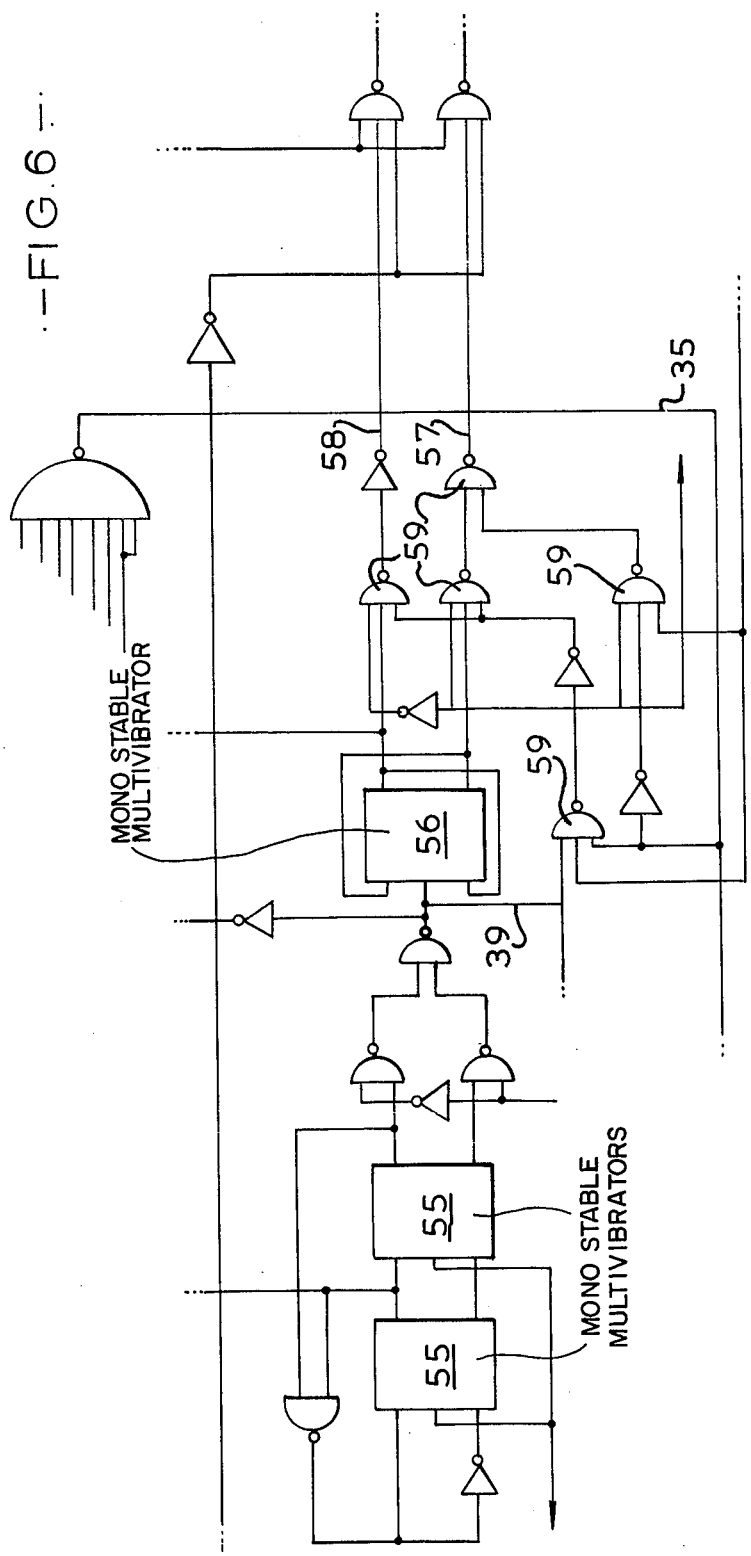

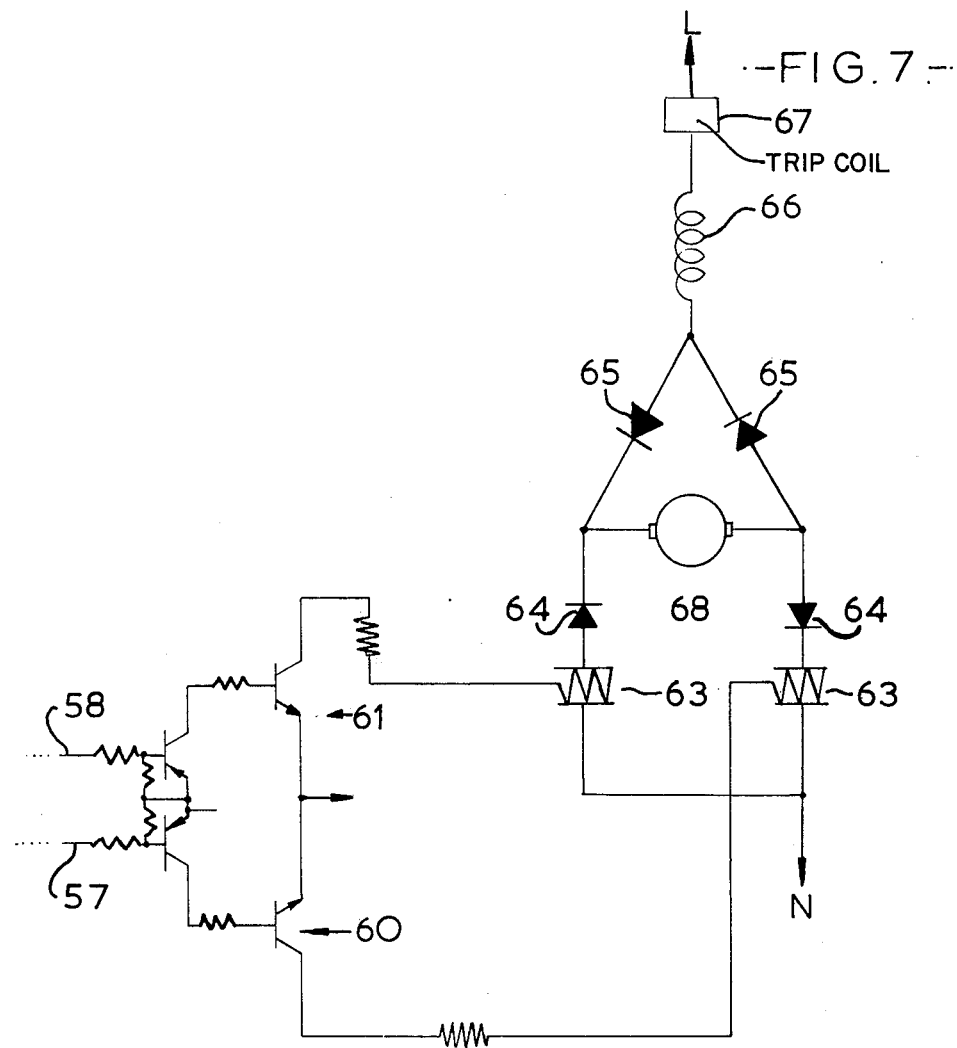

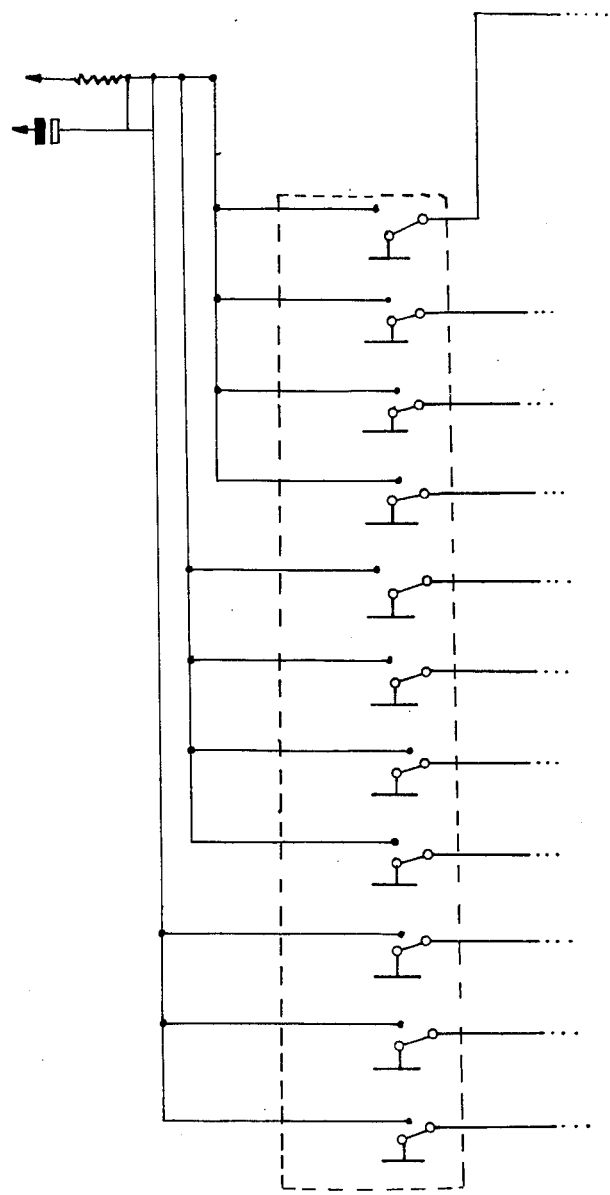
—FIG.9.—

ELECTRONIC CONTROLS

The present invention concerns electronic controls for laundry washing machines.

According to one aspect of the present invention there is provided an electronic control for a laundry washing machine having an electrical mains input characterised in that the mains input is used to generate clock pulses which are counted and used to establish time intervals for the various operations to be performed by the machine.

Conveniently the counter used to count the pulses is reset to an initial state after each operation and is restarted when various monitors indicate the correct starting conditions for the next timed operation.

Another aspect of the invention provides an electronic control for a laundry washing machine wherein a signal denoting a fixed "target" drum speed for an operation and a signal denoting actual drum speed are derived and compared in such a way as to yield a drum speed control signal which basically comprises the integral of the difference between the target and actual speeds.

By a fixed target speed is meant the ultimate value of the speed during the particular operation. To avoid damage to the machine and to the laundry, the drum cannot be jerked up to this speed but the rate of drum acceleration must be softened and in the present invention this is achieved by using not the difference signal but the integral thereof. The speed control signal can be derived as the integral of the difference or as the difference between the integrals of the target and actual speeds.

Various other aspects and features of the present invention will become apparent to those skilled in the art from the following description which is given purely by way of example and which is illustrated in the accompanying drawings in which.

Figure 1:
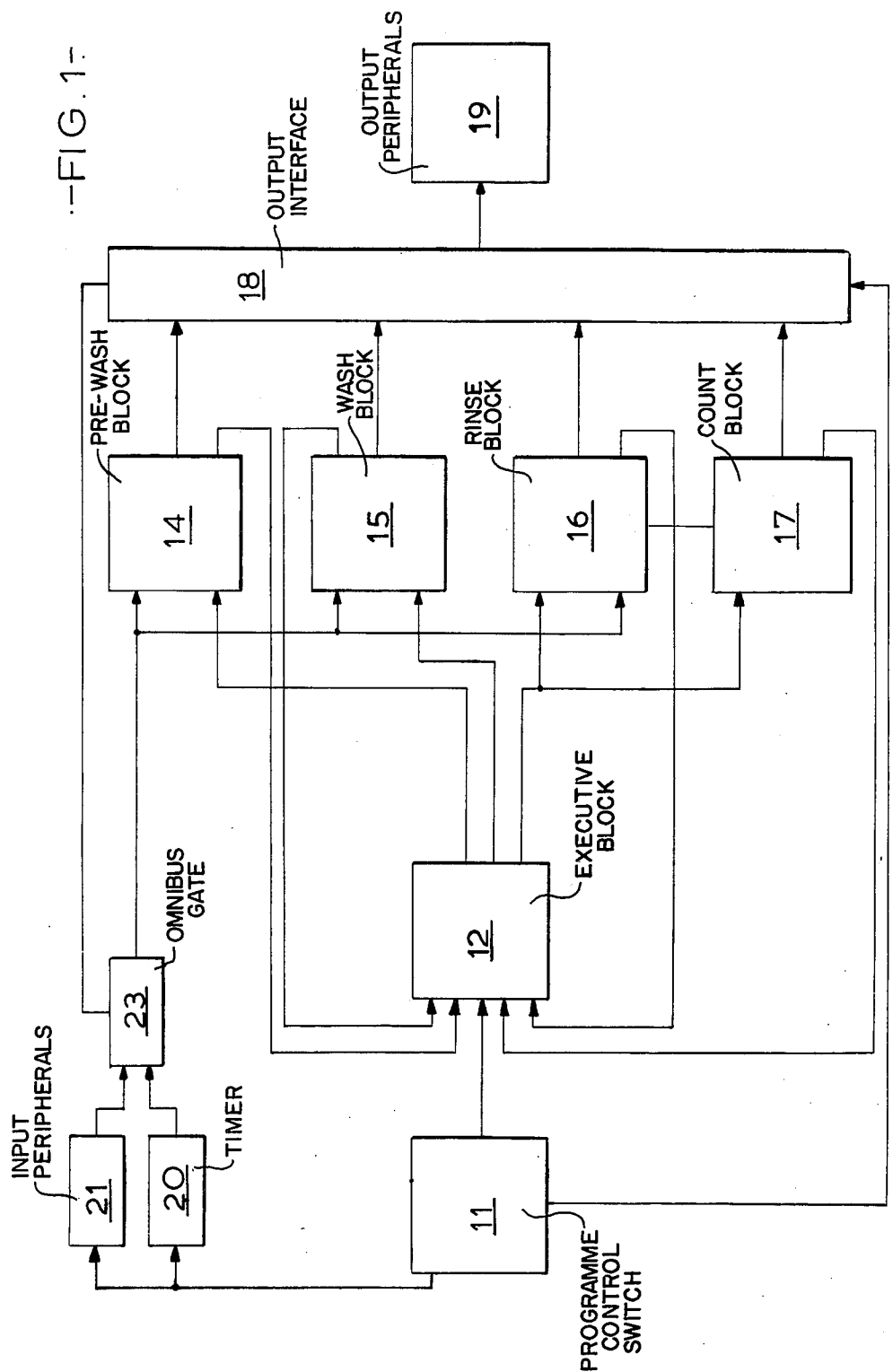
FIG. 1 is a schematic block diagram of an electronic control.
Figure 4:
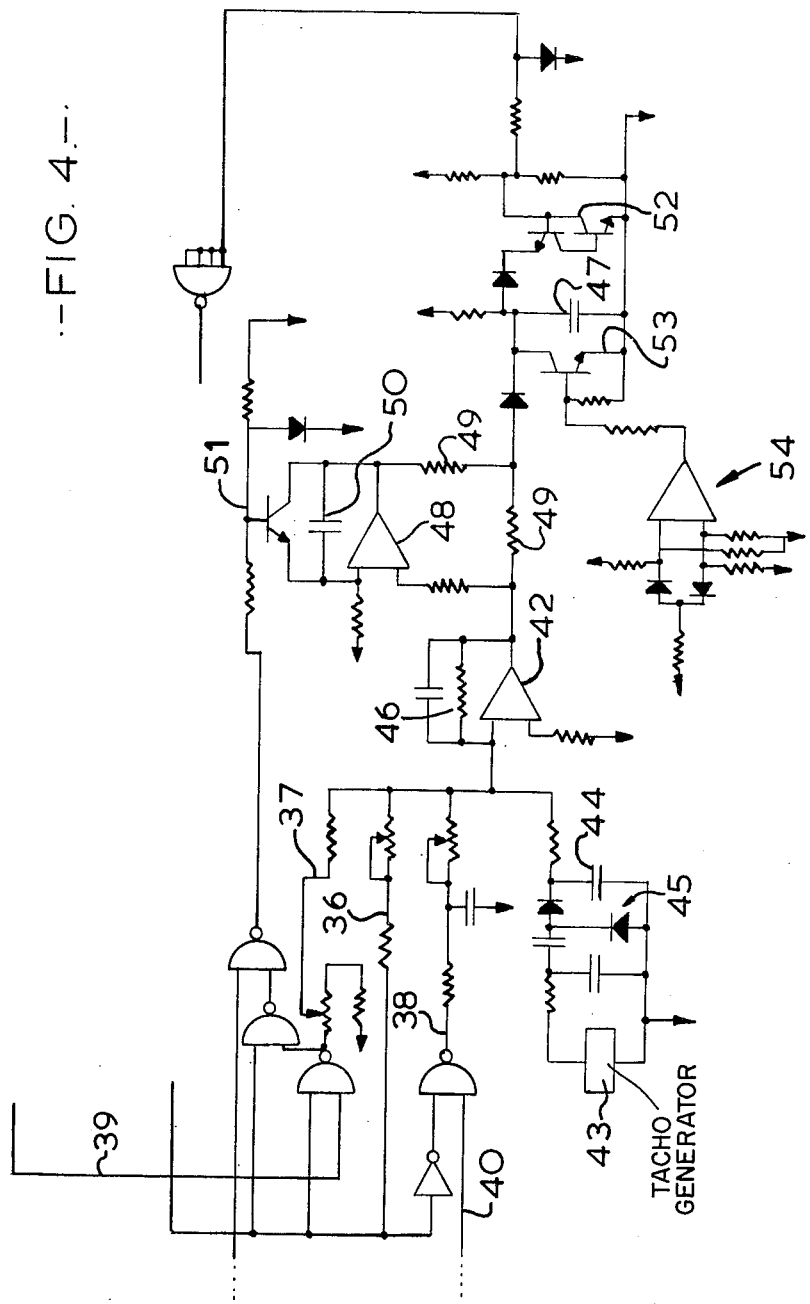

FIG. 4 is a circuit diagram of a speed regulating circuit used in the electronic control of FIG. 1, FIG. 5 is an alternative form of speed regulating circuit which can be used instead of that shown in FIG. 4 in the control of FIG. 1, FIG. 6 is a circuit diagram of a drum reversal circuit used in conjunction with the speed regulating circuit of FIG. 4 or 5, FIG. 7 is a circuit diagram showing a drum drive motor and associated means which circuit receives control inputs from the circuits of FIGS. 4 and 6 or 5 and 6 to control the speed and sense of rotation of the motor, FIG. 8 is a schematic circuit diagram of a door interlock device, FIG. 9 is a circuit diagram of an operating control switch, and FIG. 10 is a schematic diagram of a "mains-on" indicator.

Laundry washing machines have a complex cycle of operations. This is true whether the machine is of the horizontal or vertical drum types but the description will be given in relation to the horizontal drum type although the invention is applicable to all types of laundry washing machines.

Whilst the cycle can be broken down into a "prewash block", a "wash block" and a "rinse and spin-dry block", each of these blocks involves a number of different actions. The "prewash block" includes filling the drum with cold water and rotating the drum at a wash speed, reversing the sense of motor rotation at intervals, heating the water or replacing the cold water with hot water, and draining. The wash cycle is similar except that the initial filling is with hot water. The "rinse and spin-dry block" is again similar but ends with a high speed rotation of the drum in a single direction of rotation and may be repeated for up to four times. Each time the motor starts to rotate it is desirable for the drum to be accelerated gradually up to the desired speed to avoid damage to the laundry and mechanical strains on the drum drive.

FIG. 1 shows the general arrangement of a control embodying the present invention. A programme control switch 11 applies a signal to an executive block 12 which is arranged to summon a "prewash block" 14, a "wash block" 15, a "rinse block" 16, and a "count block" 17 in turn. The blocks 14 to 17 will be called generically programme blocks. The outputs of the programme blocks fan out to control through output interfaces 18 the various output peripherals 19 such as the water feed and drain pump and valves (not shown), water heater, detergent and fabric conditioner dispensers, and drum-drive motor. A timer 20, input peripherals 21 (such as water level sensors and temperature guages) and the output interfaces 18 provide monitoring signals to an omnibus gate 23 which inhibits any operation which has been otherwise summoned from commensing until conditions are right. Some of the output interfaces or peripherals can be controlled directly by the programme control switch 11 or the programme control switch used to inhibit the interfaces 18.

Figure 2:
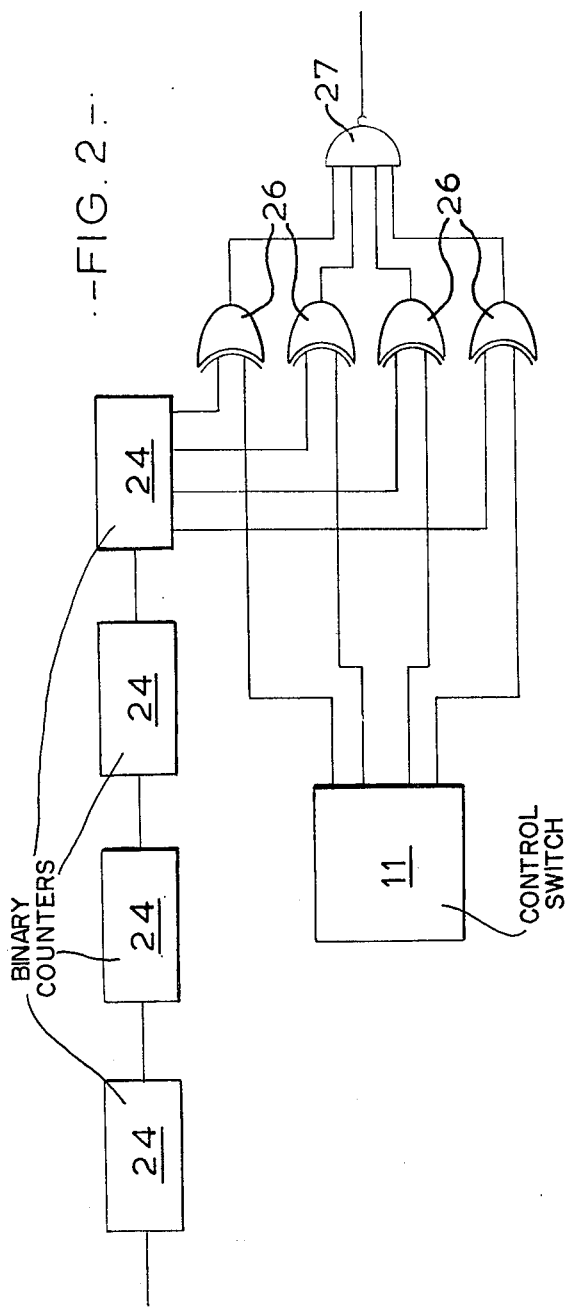
FIG. 2 is a schematic circuit diagram of a timer shown in FIG. 1.

The timer 20 is shown in FIG. 2. It comprises an array of four four-bit binary counters 24 fed by pulses derived from the mains, preferably a pulse is derived from each cycle of the mains so that with a 50 Hz. supply the timer will fill in about 11 minutes, the capacity in terms of time reducing for higher supply frequencies and increasing for lower frequencies. Outputs are taken from the stages of the last counter to gates 26 which are supplied with required time signals derived from the programme control switch 11 and if the required time corresponds to the time indicated by the timer one of the gates 26 will supply a signal to an output gate 27 and thence to the omnibus gate 23.

Figure 3:
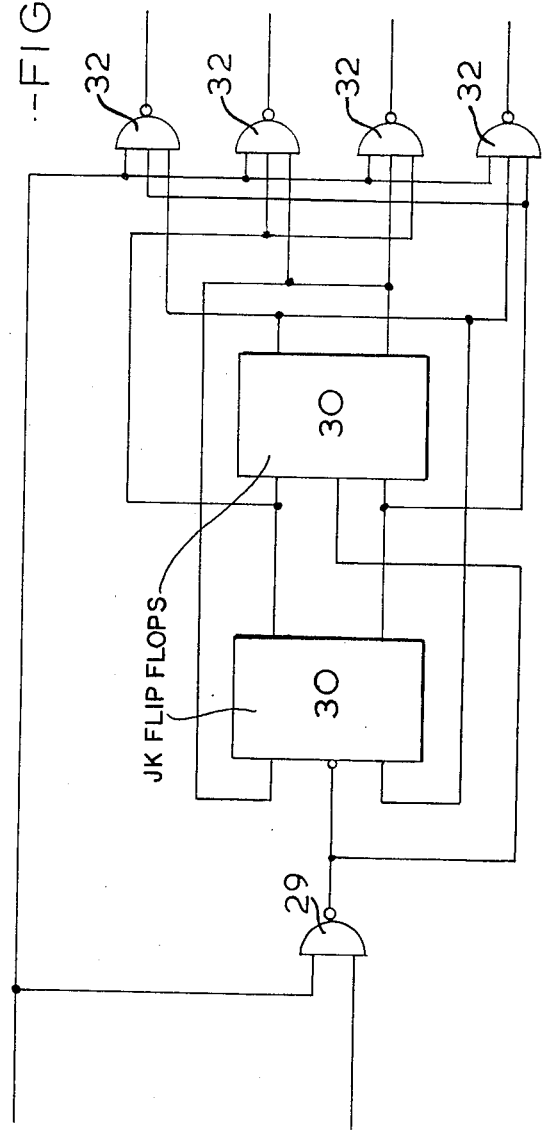
FIG. 3 is a schematic block diagram of a programme block shown in FIG. 1.

FIG. 3 is a block diagram of a programme block.

The executive block is virtually identical. An input gate 29 receives signals from the omnibus gate 23 and a summoning signal from the executive block 12 (the executive block receives its summoning signal from the programme control switch 11). The pulses from the gate are used step a pair of cross-connected J-K flip flops 30 which pair has four output states which are used to control output gates 32. The gates 32 yield output signals which are fanned out in the output interfaces 18 to control the output peripherals 19.

The general arrangement of the control is best exemplified by considering one generalised operation. Each operation has required specific starting conditions such as the drum containing water or being empty, the temperature being at a specific one of a number of levels, and the preceding operation being complete. Normally the starting conditions will be the conditions at the end of the preceding operation but it is prudent to check. Each stage whose starting conditions are to be checked has a number of gates each corresponding to one foreseeably required level of a condition and each of which is conditioned by a preceding operation complete signal. Those of these gates which correspond to the desired levels of the various conditions are selected by signals from the programme control switch or permanent wiring and in turn condition corresponding gates associated with indicating levels of various sensers so that when each senser reaches the desired level the respective one of the corresponding gates yields a desired level output. The gates mentioned in the last sentence are used to control means for reaching the desired levels. When all the desired level outputs are present, a start operation zero-time signal is used to initiate the operation and to condition a plurality of timing gates, one of which is selected by permanent wiring or from the programme control switch to condition a respective gate 26 (FIG. 2). The operation can include sub-operations such as temperature control which is independent of time and drum direction of rotation which has its own timing circuit which will be described hereinafter. A stage can include a zero time gate which results in an operation complete signal similar to that given by the gate 27 to cut out that stage if this zero time gate is selected from the programme control switch. When an operation complete signal is given, it stops the timer receiving clock pulses (and the timer automatically resets itself in the absence of these pulses) and conditions the starting condition checking gates of the next stage, calls up the next stage of the same programme block if the stage is not the last in its block, conditions the checking gates of the executive block if the stage is the last in its block and the executive block stage is not the final one, or signals cycle complete. The voltage supply rails to the blocks would contain capacitors so that the logic would remain undisturbed by supply failure transients except that the timer would reset itself.

One part of the output interface is shown in FIG. 4. A motor operation start signal arrives on a line 35 and is passed direct through a resistor chain 36 which is connected in parallel with two gated resistor chains 37 and 38. The chain 37 is gated on by the start signal and a slow speed signal on a line 39 and chain 38 by the start signal and a high speed signal on a line 40. The signal passing through the paralleled chains is a desired speed signal selected by the choice of chain 37 or 38. The desired speed signal is passed to one input of a differential amplifier 42. An alternating current tachogenerator 43 senses the actual speed of the drum rotation and charges up a smoothing capacitor 44 through a diode pump network 45 which capacitor yields an actual speed signal to the same input of the amplifier 42 in anti-phase to the desired speed signal. The capacitor is able to discharge itself through a feedback resistor 46 of the amplifier 42 and the chains 36 to 38. The output of the amplifier is an error signal and is passed to a capacitor 47 and to an integrating amplifier 48 whose output is added to the error signal (the addition being performed by the two resistors 49). A feedback capacitor 50 gives the integrating nature of the amplifier 48. This capacitor 50 is discharged by a transistor switch 51 when the motor is not summoned. The predominant integrated error signal from the amplifier 48 modified by the amplifier 42 error signal charges up to capacitor 47 at a rate depending on the modified signal and when the voltage reaches a predetermined level, a Schmidt trigger circuit 52 is fired and discharges the capacitor. The capacitor 47 is shorted by a switch 53 operated by mains synchronised pulses from a circuit 54 at the start of each mains half-cycle which switch 53 also resets the circuit 52 to a non-conducting state. By selecting the capacitor in relation to the maximum expected error signal from the amplifier 42 so that the capacitor will not charge up in a half-cycle to said predetermined level or at least only towards the end of the half-cycle, it can be ensured that the circuit 52 will not call for a jump increase in motor speed and, it is possible to arrange for the integrated error to be of such a magnitude in relation to the error signal to avoid hunting.

In the circuit of FIG. 5, the selected channels 36 to 38 control the frequency of a pulse generator 101 and the tachogenerator 43 is also arranged to emit pulses. The generator 101 is arranged to be triggered by a pulse from the tachogenerator but thereafter to be free-running at a pulse repitition rate corresponding to the desired speed so that the pulse trains from the generator and from the tacho-generator start off in phase when the motor is summoned, but the error is denoted by a phase shift. It will be noted that this error signal is a difference of integrals of speed. This error is used to yield pulses similar to the output of the Schmidt trigger circuit by means of a phase sensing circuit 102. Since there is a possibility of the circuit slipping and not comparing like with like, the output is sensed and if the error is excessive the error is reduced by suitably adjusting the pulse repetition rate of the generator 101 by means of a circuit 103. It is felt that a fuller description of the generator 101, the phase sensing circuit 102 and the circuit 103 is not necessary for an expert.

The sense of rotation of the motor is controlled by the circuit shown in FIG. 6. A pair of mono-stable multivibrators 55 arranged to give an output square wave with a period of, say, fifteen seconds and a mark/space ratio of 2:1 is triggered by a pulse from the timer; conveniently pulses are supplied every 5 seconds but only every third pulse used. The output square wave is passed by gates as called for by the programme blocks. The gated square wave is fed to the circuit of FIG. 4 on the line 39 as the slow speed signal. It is also fed to another monostable multivibrator 56 which reverses its state for every square wave input and thus has a change of state every 15 seconds. This multivibrator yields direction of rotation signals either on a forward line 57 or a reverse line 58 but these signals are gated from the multivibrators 55, from the timer, from the omnibus gate, and from the circuit 52 to give a burst of firing pulses lasting 5 seconds in every 15 seconds but the bursts being alternately on the forward and reverse lines 57 and 58 so that the motor will run first in one direction for 5 seconds, come to rest in the next 10 seconds and then rotate in the opposite direction, again come to rest, and so on whenever called on) by means of gates 59.

In FIG. 7, the firing pulses arriving on the lines 57 and 58 control through drive amplifiers 60 ad 61 rectifier switches 63. These are conveniently triacs with series diodes 64 connected in a fullwave rectifying bridge circuit with other diodes 65. This bridge circuit is connected in series with the field winding 66 of the motor and a trip coil 67 for sensing motor overloads across the mains supply. The motor armature 68 is connected across the bridge so that it receives unidirectional current. The bridge circuit does not allow full wave rectification because of the triacs but depending on which triac is conductive allows pulses of one or other polarity through the field winding so that the field winding is in effect reversed relative to the armature. It is found that this arrangement reduces armature sparking.

It has been said that some of the output peripherals can be controlled directly from the programme control switch. One such is shown in FIG. 8 and is a door latch. Unlike most controls, the present control is arranged to operate the latch when the machine is not performing a cycle. The latch is spring or gravity loaded into a locked position and has an operating solenoid 69 which is not energised during a cycle but only when the machine is connected to the supply mains but not during a cycle; this stops children having access to the drum when the machine is not being tended.

FIG. 9 is a circuit diagram of one form of programme control switch or really a part thereof. The entire programme control switch would be a row of buttons each of which would operate a switch as shown in FIG. 9. Each switch would have a number of contacts to establish logic levels. Whilst the switches could be identical they would be connected differently. The switches would have memories associated with them which memories could be electronic or electro-mechanical such as a solenoid to hold the switch actuated throughout a washing cycle.

Each switch can by-pass part of a complete cycle. Where this is particularly important is in the number of rinse operations. The switch could route a rinse finished signal from the executive block to any one of the stages in the count block by arranging the logic levels so that the count block steps by single steps, jumps a step or jumps straight to the final "wash-over" stage. The final wash-over stage of the count block calls for a delay in which the drum can coast to a halt and calls for a return to the first stage when the next complete wash cycle is summoned. After this delay the door latch is energised to allow the door to be opened. Each stage in a programme block yields a signal to step the block onto the next stage and, when the final stage is reached in any block, the next stepping signal steps the executive block; these stepping signals can be inhibited by a "programme-interrupt" over-ride which also summons up the delay and then allows the door to be opened. After an over-ride operation the logic is such that the cycle can re-start where it left off.

FIG. 10 illustrates a further aspect of the invention which is that when the mains supply is connected a warning light 71 is supplied from a relaxation oscillator 72 so that it flashes but when a cycle is in operation a triac 73 enables a circuit 74 to supply the light with enough current to keep it lit. The end of a cycle blocks off the triac so that the light flashes again.

Modifications are of course possible; one such modification would be to use the same mains derived pulses to drive the counter and to discharge the capacitor 53 in FIG. 4.

We claim:
1. An electronic control for a laundry washing machine comprising:
   drum speed regulating means;
   drum speed sensing means arranged to give a first electrical signal directly proportional to the drum speed;
   means for establishing any one of a plurality of different second electrical signals corresponding to the drum speed required;
   means for integrating the difference between the first and second signals to produce a third electrical signal;
   means for mixing the third electrical signal with a signal whose magnitude depends directly on the drum speed to produce a control signal, and means for feeding the control signal to the drum speed regulating means to regulate the speed of the drum.
2. An electrical control according to claim 1 wherein the regulating means includes a capacitor, a trigger circuit and a mains operated switch, the capacitor being charged by the control signal to fire the trigger circuit and the switch discharging the capacitor and resetting the trigger circuit periodically in dependence on the mains frequency.

* * * * *